United States Patent
Steiner

(10) Patent No.: US 9,571,644 B2
(45) Date of Patent: Feb. 14, 2017

(54) CONTACT ADVOCATE

(71) Applicant: Avaya Inc., Basking Ridge, NJ (US)

(72) Inventor: Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 84 days.

(21) Appl. No.: 14/085,672

(22) Filed: Nov. 20, 2013

(65) Prior Publication Data

US 2015/0139409 A1    May 21, 2015

(51) Int. Cl.
| | |
|---|---|
| *H04M 3/00* | (2006.01) |
| *H04M 5/00* | (2006.01) |
| *H04M 3/493* | (2006.01) |
| *G06Q 30/00* | (2012.01) |
| *H04M 3/51* | (2006.01) |

(52) U.S. Cl.
CPC ........... *H04M 3/493* (2013.01); *G06Q 30/016* (2013.01); *H04M 3/5183* (2013.01)

(58) Field of Classification Search
USPC .......................... 379/265.01, 201.02, 201.03
See application file for complete search history.

(56) References Cited

U.S. PATENT DOCUMENTS

| | | | |
|---|---|---|---|
| 5,652,789 A * | 7/1997 | Miner et al. ............ | 379/201.01 |
| 7,343,406 B1 | 3/2008 | Buonanno et al. | |
| 7,623,651 B2 * | 11/2009 | Ju ..................... | H04M 3/42059 379/265.01 |
| 2001/0051876 A1 * | 12/2001 | Seigel et al. ..................... | 705/1 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2011/0255683 A1 | 10/2011 | Flockhart et al. | |
| 2013/0050199 A1 | 2/2013 | Chavez | |
| 2013/0051547 A1 | 2/2013 | Chavez | |
| 2013/0051548 A1 | 2/2013 | Chavez | |
| 2013/0301820 A1 * | 11/2013 | Williams et al. ........ | 379/201.01 |

* cited by examiner

*Primary Examiner* — Quynh Nguyen
(74) *Attorney, Agent, or Firm* — Sheridan Ross P.C.

(57) ABSTRACT

A contact center work assignment engine communication system hosts a multi-functional contact advocate to manage communications and history for customers, including the ability to report issues, provide updates, identify and solve problems, store history, interface with contact center components, including agents and experts, creating a proactive automatic assistant for contact center customers.

19 Claims, 4 Drawing Sheets

CONTACT ADVOCATE

FIELD OF THE DISCLOSURE

The present disclosure is generally directed toward communications and more specifically toward contact centers.

BACKGROUND

In typical contact centers today, there exists a universal identifier (ID) for each customer. The ID joins data which may come into the contact center system from multiple sources. The sources might include on-line order information, system information, contact information, or other personal information, email, texts, interaction logs, etc. Contact centers employ agents to manage all ID information and history, handle orders, and resolve issues. Often servicing a contact requires looking through the contact's ID information and history of interactions with the company. Aggregating or correlating the ID and other data can be done automatically or by agents.

In current models, a system component and/or an agent reactively works to solve issues, concerns, or queries for a contact that comes into the contact center. Interactive Voice Response systems (IVRs) are typically used to preserve some agent resources by handling some contact needs through automated servicing. Some slightly more sophisticated systems also provide supplemental and/or related information to contacts (e.g., a company provides a weather report when the contact is traveling). Most companies live with reactive models of customer service that don't find and solve problems without agent intervention. Reactive models are inefficient since agents must review ID data and history and may not be aware of other activities in the contact center.

SUMMARY

These and other needs are addressed by the various aspects, embodiments, and/or configurations of the present disclosure. The present disclosure is directed to a contact advocate that can proactively manage issues and retain ID data and history for a contact center customer, thereby enabling a new level of efficiency for issue preemption and resolution. A contact advocate module is proposed herein that is capable of creating and deploying contact advocates operable to work proactively on behalf of the contact.

Contact centers look to preserve precious and expensive resources in all operational areas. Once resource area that tends to be expensive is the use of a live agent to react to customer queries and/or problems. One way to preserve agent resources as part of a reactive solution is the use of an IVR which automates interactions with callers. When an agent has to get involved with a work item that is beyond the help of the IVR, he or she may need to review the ID data and history of a contact. He or she may have to speak to the contact to determine the nature of the problem. This is time-consuming and inefficient, especially when an intelligent, proactive contact advocate can do this automatically. The contact advocate can work as a personal assistant on behalf of a contact within the contact center.

The model of the contact advocate is the inverse of what occurs today. The contact advocate that represents a contact can proactively look in a contact center communication system to find a solution to a problem. The contact advocate has access to all customer interactions, allowing the contact advocate to actively use system resources to meet the contact's needs. Like a noSQL model, the contact advocate also has data that stays with the contact advocate for the customer, including but not limited to communication and order history. Effectively, the contact advocate owns and stores all of the contact's history and adds to the history with subsequent engagements. Once invoked, the contact advocate can query and scan to see if there is any information that the contact advocate should proactively send out to the contact.

Every transaction can be recorded and maintained by the contact advocate through an object-oriented database. The data maintained by the contact advocate can be continuously updated by the contact advocate module. For new customers that have issues and/or queries, a default or basic advocate can be created in response to an first communication that has a specific and/or common purpose (e.g., an order bot). The object for the contact advocate is always available in the background, and the contact advocate can be activated by triggers for specific events and/or event types. Very much like a simulation, the contact advocate can respond to stimulus by running simple programs and returning information. All components of a contact center communication system can be in contact with the contact advocate, including but not limited to agents, experts, reporting systems, ticketing systems, and ordering systems. The contact advocate can function as a virtual customer that is owned and managed by the contact center on behalf of the contact. The contact advocate can also function as a proxy for a contact, managing any communication media and/or channel, including but not limited to web, cellular, email, telephone, voicemail, text, and chat.

A common question that comes into the contact center communication system is, "What is the status of my order?" The contact advocate would query for status information on the contact's order based on the contact's ID. For example, the contact advocate might return a message, "The Bluetooth headset model X order has been processed and the tracking number is X73GH4009." The contact advocate can also log the interaction in the contact's history. The contact advocate might also proactively email an expert and ask if there have been any issues related to the headset in the order (e.g., Do you know of any Bluetooth issues with model X?). The contact advocate can send out information and/or known solutions derived from other interactions within the contact center, information from previous interactions, and provide information from the expert. The contact advocate is operable to provide the information to the contact in the form of reports, emails, alerts, texts, etc. For example, a text message might be sent by the contact advocate, "The Bluetooth headset has been known to drop calls when mute is activated. Please contact us when you receive the headset so that we can give you a fix for the issue. We apologize for the inconvenience."

Another embodiment might include policies of how long to keep the contact advocate and what policies are enforced for the contact ID and other data, including temporal lifecycle and archiving parameters and thresholds.

These and other advantages will be apparent from the disclosure. In some embodiments a method is provided which generally comprises:

receiving a communication from a customer of a contact center;

based on the received communication, invoking a contact center advocate on behalf of the customer;

subscribing, by the contact center advocate, to one or more contact center events based on at least one of (i)

information contained in the received communication and (ii) information known within the contact center about the customer;

receiving information regarding the one or more contact center events at the contact center advocate, wherein the information is received at the contact center advocate based on the contact center advocate subscribing to the one or more contact center events; and performing a function on the received information with the contact center advocate.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The phrase "Call Management System (CMS)" as used herein refers to an Avaya application that includes database, administration, and reporting features to help businesses identify and take action on operational issues.

The term "advocate" or phrase "contact advocate" as used herein refers to software including machine instructions, source code, and/or artificial intelligence. The contact advocate may consist of but is not limited to a program, application, procedures, high-level language, functions, data, and documentation.

The term "user," "customer," or "client" denotes a party patronizing, serviced by, or otherwise doing business with a contact center or other type of enterprise.

The terms "determine," "calculate," and "compute," and variations thereof as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

Figure 1:
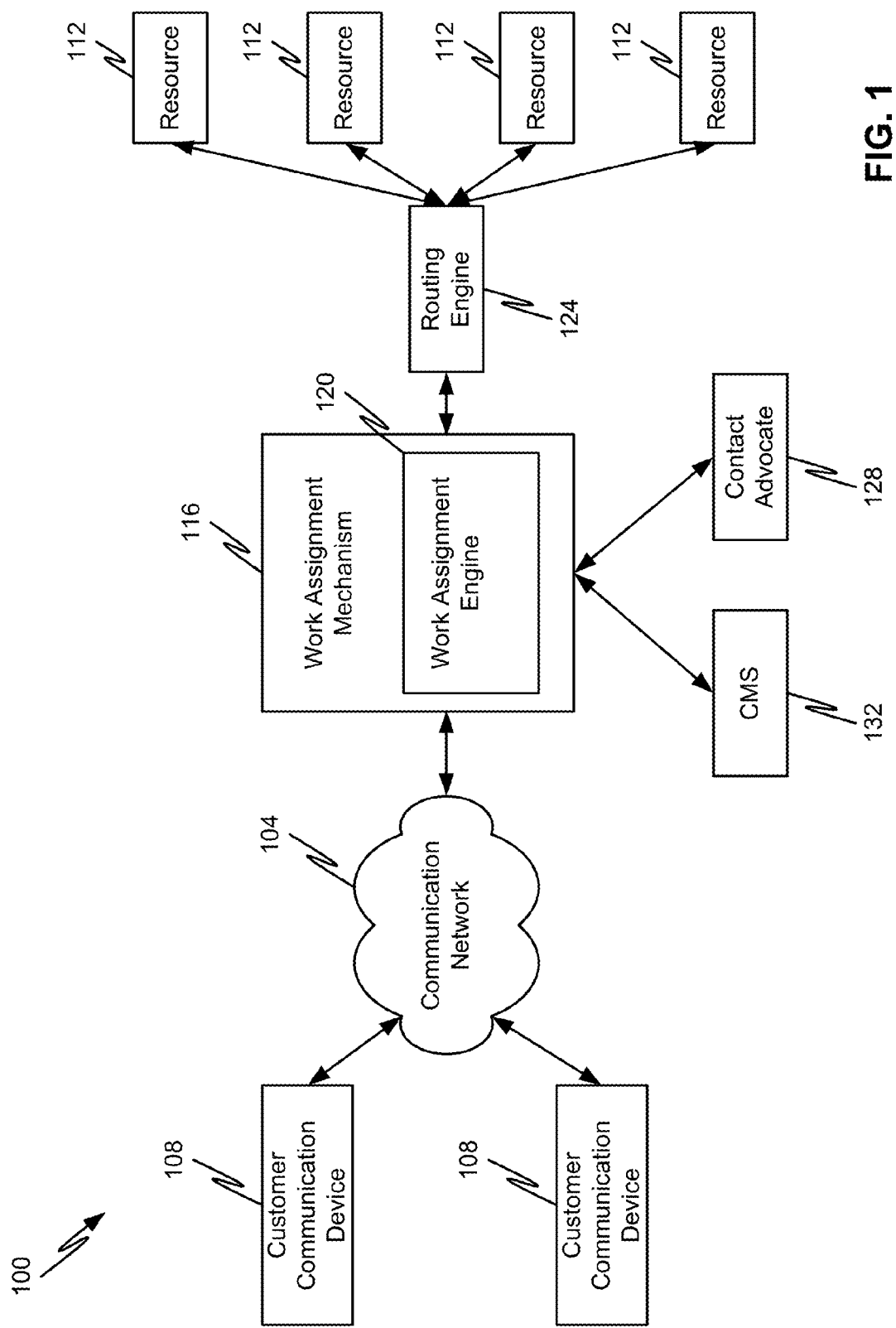
FIG. 1 is a block diagram of a communication system in accordance with embodiments of the present disclosure.

FIG. 1 depicts a communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering a contact center in which a plurality of resources 112 are distributed to handle incoming work items from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. Patent Application Publication No. 2010/0296417, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. Patent Application Publication Nos. 2010/0235218, 2011/0125826, and 2011/0125793, each of which are hereby incorporated herein by reference in their entirety.

The work assignment mechanism 116 may employ any queue-based or queueless work assignment algorithm. Examples of queue-based work assignment skill-based algorithms include, without limitation, a fairness algorithm, pacing algorithm (which inserts rests into the agents work queue), value-based algorithms, limited algorithms (such as Business Advocate™ by Avaya, Inc.), and outsourcing algorithms. Other algorithms may consider other types of data inputs and/or may treat certain data inputs differently.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 124 to connect the communication device 108 to the assigned resource 112.

Although the routing engine 124 is depicted as being separate from the work assignment mechanism 116, the routing engine 124 may be incorporated into the work assignment mechanism 116 or its functionality may be executed by the work assignment engine 120.

In accordance with at least some embodiments of the present disclosure, the customer communication devices 108 may comprise any type of known communication equipment or collection of communication equipment. Examples of a suitable communication device 108 include, but are not limited to, a personal computer, laptop, tablet, cellular phone, smartphone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon communication applications available on the communication device 108.

In accordance with at least some embodiments of the present disclosure, the work item is sent toward a collection of processing resources 112 via the combined efforts of the work assignment mechanism 116 and routing engine 124. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112a-n connected to the work assignment mechanism 116.

In some embodiments, the work assignment mechanism 116 comprises a work assignment engine 120 which enables the work assignment mechanism 116 to make intelligent routing decisions for work items and/or a contact advocate module 128. In some embodiments, the work assignment engine 120 is configured to administer and make work assignment decisions in a queueless contact center, as is described in U.S. Patent Application Publication No. 2011/0255683, the entire contents of which are hereby incorporated herein by reference.

More specifically, the work assignment engine 120 can determine which of the plurality of processing resources 112 is qualified and/or eligible to receive the work item and further determine which of the plurality of processing resources 112 is best suited (or is the optimal processing resource) to handle the processing needs of the work item. In situations of work item surplus, the work assignment engine 120 can also make the opposite determination (i.e., determine optimal assignment of a work item resource to a resource). In some embodiments, the work assignment engine 120 is configured to achieve true one-to-one matching by utilizing bitmaps/tables and other data structures.

The work assignment mechanism 116 can communicate with the contact advocate module 128 which may provide communication between a contact and contact center components. The work assignment mechanism 116 can communicate with a Call Management System (CMS) 132 which may provide integrated analysis and reporting on the performance of one agent, a group of agents, a single contact center site, or multiple contact center sites. The contact advocate module 128 may additionally integrate CMS 132, component, and application data for display on a user interface of the customer communication device 108 and/or an agent workstation. Components and applications may work in conjunction with the contact advocate module 128, providing both native functionality and third-party functionality provided by an API.

Figure 2:
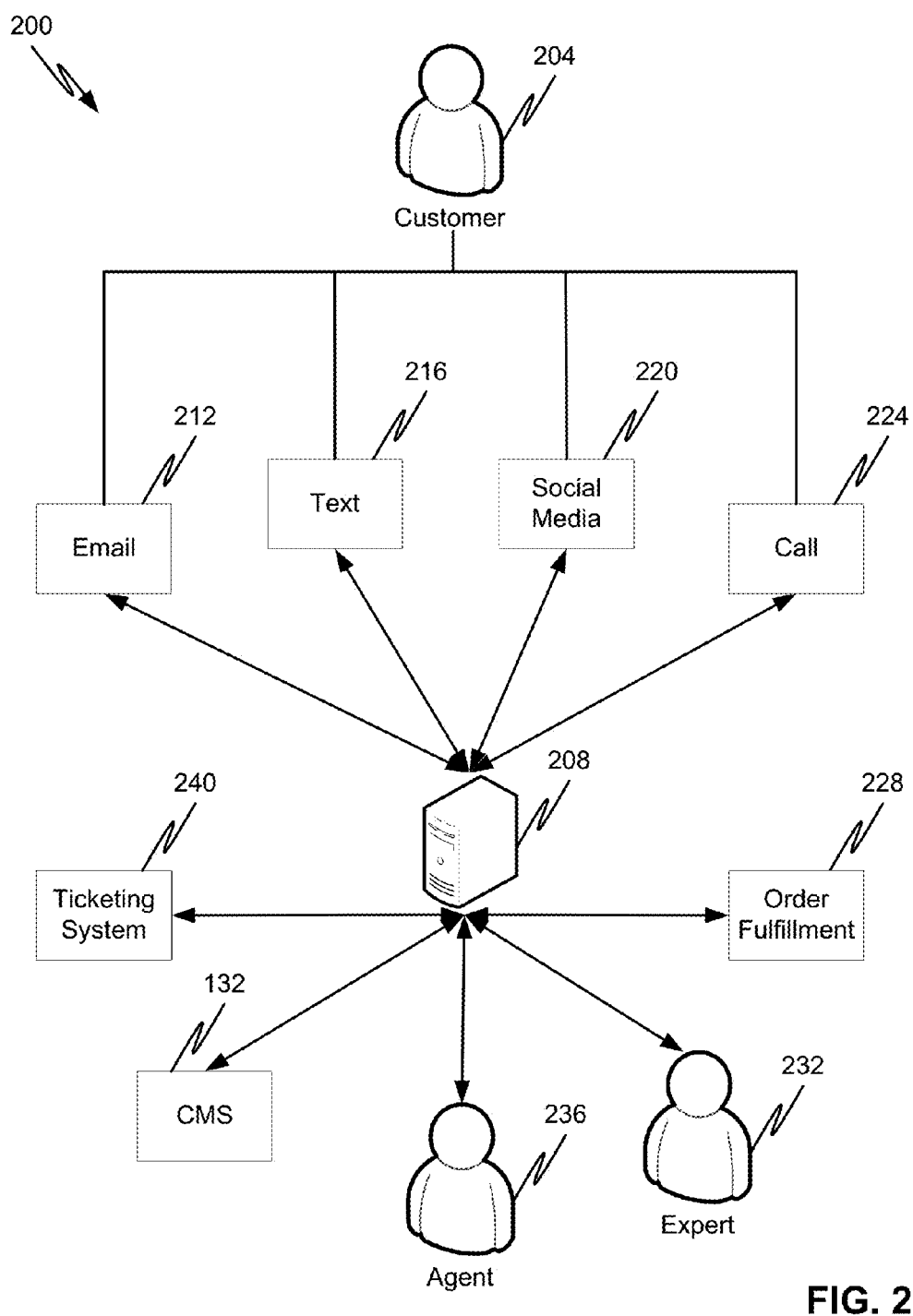
FIG. 2 is an example of contact advocate communication in accordance with embodiments of the present disclosure.

FIG. 2 depicts contact advocate communication 200 in accordance with at least some embodiments of the present disclosure. A contact advocate 208 may reside in any type of known server and/or hardware running host and content management software that allows database access, communication services, and a user interface, including but not limited to a server as shown in FIG. 2.

A customer 204 may communicate with a contact advocate 208 using one or more communication channels. The channels might include email 212, text 216, social media pages 220, and telephone calls 224. The customer 204 may send or receive communication to and from the contact advocate 208 over any or all of the channels. The contact advocate 208 is operable to communicate with components of the contact center communication system 100 on behalf of the customer 204. The contact advocate 208 may send or receive information over any available communication channel to contact center components including, but not limited to, an order fulfillment component 228, an expert 232, an agent 236, a CMS 132, and a ticketing system component 240. Additionally, the contact advocate 208 may be optionally configured to communicate with components in a distributed system or with components outside of the contact center communication system 100.

In a non-limiting example, a customer Sarah 204 may post a question on a social media website 220 managed by a company called Cool Wraps. Sarah 204 posts a question regarding when the new wrap that has a design from her favorite show Over the Wall will be available. Sarah's friend Mark told her that the alpaca wool wrap that was featured on the first few episodes of Over the Wall and worn by character Steren Teague will soon be available from the company and Sarah 204 is anxious to buy one.

Since Sarah 204 has ordered products from Cool Wraps in the past, Sarah 204 already has a contact advocate 208 that keeps track of her history, manages communications with Cool Wraps, and proactively finds information that may be of use to her. Sarah's contact advocate 208 receives an event notification that a post from Sarah has been detected. The contact center communication system 100 creates a work item in the ticketing system 240. The contact advocate 208 runs an analysis on her social media post, detecting that the question is one that the contact advocate 208 can handle. The contact advocate 208 accepts the work item and queries an order fulfillment component 228 to find a date of release for the Steren Teague wrap. The contact advocate 208 also runs a scan to see if any related products are available or if there are any known issues. Once the contact advocate 208 is provided the date of availability from the order fulfillment component 228, the contact advocate 208 posts a message to Sarah 204 on Cool Wrap's social media page 220 letting her know that the wraps can be ordered a week from now for $45.00 plus shipping costs. The contact advocate 208 also sends a separate email 212 to Sarah 204, thanking her for the question and also including the information regarding availability of the Steren Teague wrap and suggesting the purchase of a matching set of gloves for $15.00 plus shipping costs. By answering the social media post 220 question using both media channels (social media 220 and email 212), the contact advocate 208 allows other customers to see the release date of the wrap and provides Sarah 204 with an answer and a proactive, personal communication that includes an opportunity for the company to suggest an upsell during a potential sale. Once the social media post 220 and the email 212 have been sent, the contact advocate 208 notifies the ticketing system 240 that the work item has been completed, and the work item is closed.

By using the contact advocate 208 as a proactive resource for customer Sarah 204, the agent 236 and the expert 232 remain free to handle more sophisticated issues or issues requiring human intervention and/or analysis. Had the contact advocate 208 been unable to detect an answer to Sarah's query, the contact advocate 208 could have contacted the agent 236 and/or the expert 232 for assistance via text or email.

Figure 3:
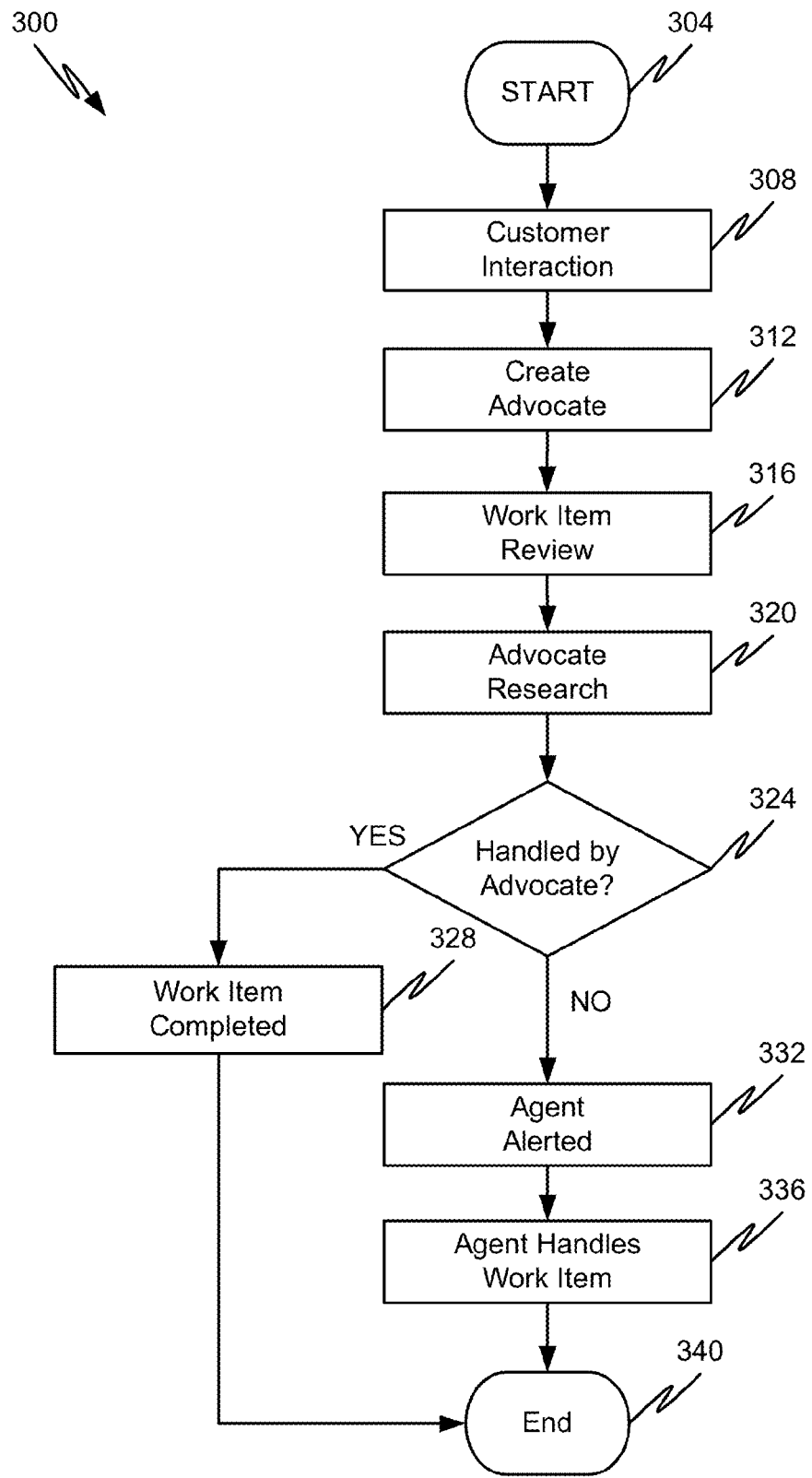
FIG. 3 is a flow diagram for a method of creation of a contact center advocate in accordance with embodiments of the present disclosure.

The method 300 for creation of a contact center advocate in accordance with embodiments of the present disclosure is shown in FIG. 3. Generally, the method 300 begins with a start operation 304 and concludes with an end operation 340. While a general order for the steps of the method 300 are shown in FIG. 3, the method 300 can include more or fewer steps or the order of the steps can be arranged differently than those shown in FIG. 3. The method 300 can be executed as a set of computer-executable instructions executed by a computer system and encoded or stored on a computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 300 shall be explained with reference to systems, components, modules, software, data structures, etc. described in conjunction with FIGS. 1-2.

Generally, the method begins at step 304. The method continues when a customer 204 initiates a request or sends a query to a contact center and the request or the query is received, in step 308. Customer interaction may generate a message to initiate the creation of a contact advocate 208 by a contact advocate module 128, in step 312.

For example, a first-time customer John 204 may contact the company to order an above-ground pool. The contact advocate 208 may be created for John 204 as a generic or simple contact advocate 208 for John's first customer interaction, potentially capable of handling a simple query from John 204 (i.e., helping with an order). In step 316, the newly created contact advocate 208 may review a request or query from John 204 which is handled as a work item. In step 320, the contact advocate 208 may research the work item. The contact advocate 208 may search all contact center communication system records, files, applications, logs, databases, and other resources to assess what is needed to bring the work item to resolution. In step 324, an analysis may be conducted to determine if the work item can be handled by the contact advocate 208 for the customer 204. In the example, the contact advocate 208 may query and receive information including price, availability, and shipping information for the pool from the order fulfillment component 228. The contact advocate 208 may access additional pool information from one or more resources in the contact center communication system 100 such as CMS 132, an expert 232, an agent 236, and a ticketing system 240. If the answer to the question is yes, the contact advocate 208 can handle the work item (i.e., provide all of the information needed for a pool purchase), the contact advocate 208 accepts the work item and sends the information to John. The contact advocate may complete the work item (step 328) without any agent assistance and/or intervention. The contact advocate 208 may send information back to John via email 212, text 216, social media 220, a call 224, or any other communication channel or channels. Once the work item has been completed, the method ends (step 340). If the answer to the question in step 324 is no, the contact advocate 208 can alert an agent 236 to take the work item in step 332 and optionally provide information on the pool from the analysis and queries. Examples of appropriate agent intervention might include a work item where the customer John 204 asks for live agent assistance and for subjective analysis of the pool choices. In step 336, the agent 236 may address the work item, which may consist of but is not limited to, working the work item and contacting the customer directly and/or working the work item and giving the information to the contact advocate 208 to send back to John 204. Once the agent 236 has completed the work item, the method ends (step 340).

Figure 4:
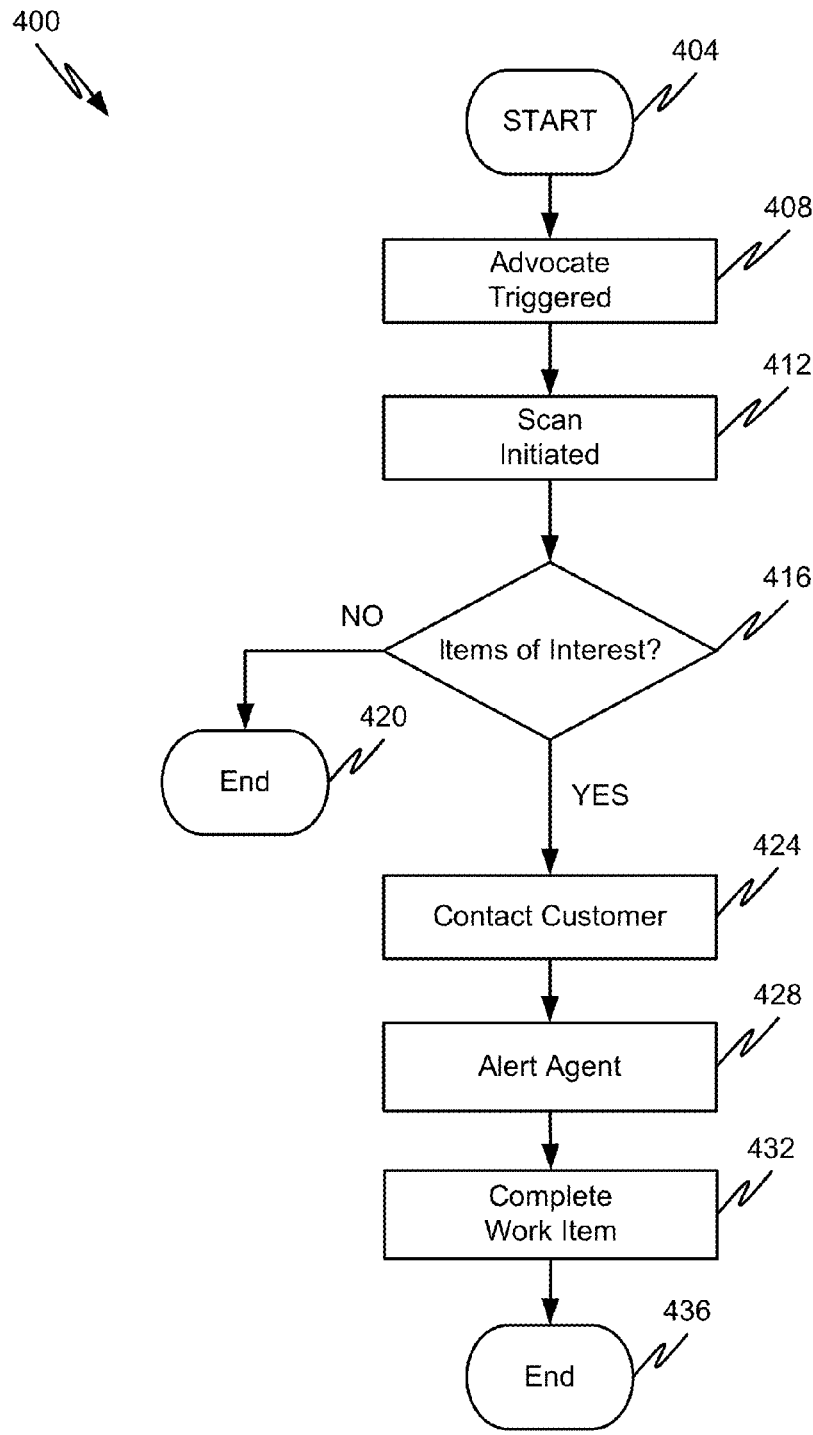
FIG. 4 is a flow diagram for a method for contact advocate subscription notification and invocation in accordance with embodiments of the present disclosure.

The method 400 for contact advocate subscription notification and contact advocate invocation in accordance with embodiments of the present disclosure is shown in FIG. 4. Generally, the method 400 begins with a start operation 404 and concludes with an end operation 436. While a general order for the steps of the method 400 are shown in FIG. 4, the method 400 can include more or fewer steps or the order of the steps can be arranged differently than those shown in FIG. 4. The method 400 can be executed as a set of computer-executable instructions executed by a computer system and encoded or stored on a computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 400 shall be explained with reference to systems, components, modules, software, and data structures, described in conjunction with FIGS. 1-3.

The method 400 begins at step 404 and continues when a communication from a customer 204 is received by a contact center. The receipt of the communication may trigger a notification event that the communication from the customer 204 has been received, in step 408. A contact advocate 208 may be awakened, or invoked, by the receipt of the notification event based on an existing subscription for an event type and for the customer 204 with a particular ID or other identifying data. In step 412, the contact advocate 208 may initiate a scan and/or analysis based on the event created from the communication from the customer 204. In addition to subscription-based monitoring of incoming and/or available data, the contact advocate 208 may also be available on demand from the agent 236. While the scan is running in step 412, the agent 236 may send an alert and/or signal of some kind to the contact advocate 208, requesting assistance. The contact advocate module 128 may provide results of the analysis and/or scan to the contact advocate 208 to answer the question as to whether or not there exists an item of interest to the customer 204 or an agent assistance request, in step 416. If no work item is created and there are no items of interest for the contact advocate 208 or agent 236 to provide to the customer 204, the method ends in step 420. If a work item is created or an agent 236 needs a response, the contact advocate 208 may respond to the customer 204 in a form including, but not limited to, an email 212, a text 216, a social media post 220, or a call 224 and/or respond directly to the agent 236 (step 424). If additional information is required as determined by the contact advocate 208, an agent 236 may be alerted, in step 428. Once the agent 236 has been alerted, he or she may accept the work item. The work item may be completed by the contact advocate 208, the agent 236, or a combination of effort by the two, in step 432. The ticketing system 240 can be updated when the work item is completed (step 432). Once the contact advocate 208 or the agent 236 completes the work item, the method ends, in step 436.

With each communication from a customer to a company, a new contact advocate 208 may be created or an existing contact advocate 208 may be invoked by subscriptions to particular events. The event-based, persistent contact advocate 208 can employ known methods, including event detection, event notification, speech analytics, scheduling, querying, etc. to manage transactions, policies, and notifications.

The contact advocate 208 can reside in the contact center indefinitely, or alternately the contact advocate 208 can expire after a fixed time and/or a period of inactivity specified by an administrator. Additional policies can be enforced or removed for lifecycle and archiving.

In an additional embodiment, additional modules can be created to provide new contact advocate 208 behaviors, including proactive notification to customers using mechanisms beyond subscriptions and to hook to additional events, customer and agent alerts, and other information mechanisms to provide services to agents and customers.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

What is claimed is:

1. A method of facilitating contact center operations, the method comprising:

receiving a communication from a customer of a contact center, wherein the communication from the customer is a posting on a social media website;

based on the received communication, invoking, by a microprocessor, a contact center advocate on behalf of the customer, wherein the contact center advocate functions as a proxy for the customer within the contact center by communicating with components of the contact center on behalf of the customer, obtaining information from the components of the contact center on behalf of the customer, and communicating the information obtained from the components of the contact center to the customer without requiring human agent assistance or intervention after the posting on the social media web site;

storing data specific to the customer at the contact center advocate that comprises a communication history for the customer and an order history for the customer;

subscribing, by the contact center advocate, to one or more contact center events based on one of (i) information contained in the received communication or (ii) information known within the contact center about the customer;

receiving information regarding the one or more contact center events at the contact center advocate, wherein the information is received at the contact center advocate based on the contact center advocate subscribing to the one or more contact center events;

updating the data specific to the customer stored at the contact center advocate to include information describing the one or more contact center events; and performing a function on the received information with the contact center advocate, wherein the performed function on the received information comprises automatically generating a new work item in the contact center on behalf of the customer and wherein the new work item is for a contact center agent to initiate a voice call to the customer to address the posting on the social media website.

2. The method of claim 1, further comprising:

determining that the contact center advocate is capable of handling the new work item without human intervention;

in response to determining that the contact center advocate is capable of handling the new work item without human intervention, enabling the contact center advocate to submit one or more queries to the components of the contact center, the one or more queries being related to the work item;

receiving, at the contact center advocate, responses to the one or more queries from the components of the contact center;

allowing the contact center advocate to formulate a response to the new work item based on the responses received to the one or more queries;

enabling the contact center advocate to select a communication channel over which to communicate the formulated response; and enabling the contact center advocate to transmit the formulated response over the selected communication channel without requiring any human agent assistance or intervention.

3. The method of claim 1, wherein the contact center advocate is awakened upon receiving the information regarding the one or more contact center events.

4. The method of claim 1, wherein the subscription comprises an identifier associated with the customer and wherein the information received also references the identifier.

5. The method of claim 1, wherein the components of the contact center comprise one or more of contact center communication system records, files, applications, databases, and resources to obtain information that can bring a work item for the customer to resolution.

6. The method of claim 1, wherein automatically generating the new work item in the contact center on behalf of the customer comprises placing the work item for the contact center agent to initiate the voice call to the customer in a contact center queue.

7. The method of claim 1, wherein automatically generating the new work item in the contact center on behalf of the customer further comprises sending an email to an expert to ask the expert if there have been any issues related to the posting on the social media website.

8. A contact center server, comprising:

a processor; and a non-transitory computer-readable medium coupled to the processor and comprising processor-executable instructions, the instruction comprising:

instructions to receive a communication from a customer of a contact center, wherein the communication from the customer is a posting on a social media website;

based on the received communication, instructions to invoke a contact center advocate on behalf of the customer, wherein the contact center advocate functions as a proxy for the customer within the contact center by communicating with components of the contact center on behalf of the customer, obtaining information from the components of the contact center on behalf of the customer, and communicating the information obtained from the components of the contact center to the customer without requiring human agent assistance or intervention after the posting on the social media web site;

instructions to store data specific to the customer at the contact center advocate that comprises a communication history for the customer and an order history for the customer;

instructions to cause the contact center advocate to subscribe to one or more contact center events based on one of (i) information contained in the received communication or (ii) information known within the contact center about the customer;

instructions to receive information regarding the one or more contact center events at the contact center advocate, wherein the information is received at the contact center advocate based on the contact center advocate subscribing to the one or more contact center events;

instructions to update the data specific to the customer stored at the contact center advocate to include information describing the one or more contact center events; and instructions to perform a function on the received information with the contact center advocate, wherein the performed function on the received information comprises automatically generating a new work item in the contact center on behalf of the customer and wherein the new work item is for a contact center agent to initiate a voice call to the customer to address the posting on the social media website.

9. The contact center server of claim 8, wherein the instructions further comprise:

instructions to generate and send a message to the customer over a communication channel selected by the contact center advocate, wherein the message informs the customer about the one or more contact center events.

10. The contact center server of claim 8, wherein the instructions further comprise:

instructions to awaken a contact center advocate upon receiving the information regarding the one or more contact center events.

11. The contact center server of claim 8, wherein the subscription comprises an identifier associated with the customer and wherein the information received also references the identifier.

12. The contact center server of claim 8, wherein the instructions further comprise:

instructions to search at least one of contact center communication system records, files, applications, databases, and resources to obtain information that can bring a work item for the customer to resolution.

13. The contact center server of claim 8, wherein automatically generating the new work item in the contact center on behalf of the customer comprises placing the work item for the contact center agent to initiate the voice call to the customer in a contact center queue.

14. The contact center server of claim 8, wherein automatically generating the new work item in the contact center on behalf of the customer further comprises sending an email to an expert to ask the expert if there have been any issues related to the posting on the social media website.

15. A communication system, comprising:

a contact advocate module that receives a communication from a customer of a contact center and causes a processor to perform the following operations:

based on the received communication, invoke a contact center advocate on behalf of the customer, wherein the contact center advocate functions as a proxy for the customer within the contact center by communicating with components of the contact center on behalf of the customer, obtaining information from the components of the contact center on behalf of the customer, and communicating the information obtained from the components of the contact center to the customer without requiring human agent assistance or intervention;

store data specific to the customer at the contact center advocate that comprises a communication history for the customer and an order history for the customer;

subscribe via the contact center advocate to one or more contact center events based on one of (i) information contained in the received communication or (ii) information known within the contact center about the customer;

receive information regarding the one or more contact center events at the contact center advocate, wherein the information is received at the contact center advocate based on the contact center advocate subscribing to the one or more contact center events;

update the data specific to the customer stored at the contact center advocate to include information describing the one or more contact center events;

perform a function on the received information with the contact center advocate, wherein the function performed on the received information comprises generating a new work item within the contact center on behalf of the customer;

determine that the contact center advocate is capable of handling the new work item without human intervention;

in response to determining that the contact center advocate is capable of handling the new work item without human intervention, enable the contact center advocate to submit one or more queries to the components of the contact center, the one or more queries being related to the work item;

receive, at the contact center advocate, responses to the one or more queries from the components of the contact center;

allow the contact center advocate to formulate a response to the new work item based on the responses received to the one or more queries;

enable the contact center advocate to select a communication channel over which to communicate the formulated response; and enable the contact center advocate to transmit the formulated response over the selected communication channel without requiring any human agent assistance or intervention.

16. The system of claim 15, wherein the function performed on the received information by the contact center advocate comprises generating and sending a message to the customer that informs the customer about the one or more contact center events.

17. The system of claim 15, wherein the contact advocate module causes the processor to perform the following operation:

awaken the contact center advocate upon receiving the information regarding the one or more contact center events.

18. The system of claim 15, wherein the subscription comprises an identifier associated with the customer and wherein the information received also references the identifier.

19. The system of claim 15, wherein the contact advocate module causes the processor to perform the following operation:

search at least one of contact center communication system records, files, applications, databases, and resources to obtain information that can bring a work item for the customer to resolution.

* * * * *